United States Patent
Higashi et al.

(10) Patent No.: US 9,228,678 B2
(45) Date of Patent: Jan. 5, 2016

(54) DOOR HARNESS ATTACHING STRUCTURE

(71) Applicant: Yazaki Corporation, Tokyo (JP)

(72) Inventors: Yoshitaka Higashi, Hiroshima (JP);
Tetsuya Hirano, Hiroshima (JP);
Hiroyuki Katayama, Hiroshima (JP);
Masayoshi Kamenoue, Hiroshima (JP);
Masaoki Yoshida, Hiroshima (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/477,941

(22) Filed: Sep. 5, 2014

(65) Prior Publication Data

US 2015/0069189 A1    Mar. 12, 2015

(30) Foreign Application Priority Data

Sep. 10, 2013   (JP) .................................. 2013-187481

(51) Int. Cl.
| | |
|---|---|
| *F16L 3/08* | (2006.01) |
| *F16L 3/06* | (2006.01) |
| *B60J 5/04* | (2006.01) |
| *B60J 9/00* | (2006.01) |
| *F16L 3/12* | (2006.01) |
| *F16L 5/00* | (2006.01) |
| *B60R 16/02* | (2006.01) |

(52) U.S. Cl.
CPC ................. *F16L 3/06* (2013.01); *B60J 5/0493* (2013.01); *B60J 9/00* (2013.01); *B60R 16/0222* (2013.01); *F16L 3/1222* (2013.01); *F16L 5/00* (2013.01)

(58) Field of Classification Search
CPC ... B60R 16/0222; B60R 16/0207; H02G 3/32
See application file for complete search history.

(56) References Cited

U.S. PATENT DOCUMENTS

| | | | | |
|---|---|---|---|---|
| 6,051,790 A | * | 4/2000 | Takeuchi et al. | 174/72 A |
| 2005/0194175 A1 | * | 9/2005 | Serizawa et al. | 174/65 G |
| 2010/0025077 A1 | * | 2/2010 | Ujita | 174/153 G |

FOREIGN PATENT DOCUMENTS

| | | |
|---|---|---|
| JP | 2002-120668 A | 4/2002 |
| JP | 2002-274289 A | 9/2002 |

* cited by examiner

Primary Examiner — Amy Sterling
(74) Attorney, Agent, or Firm — Locke Lord LLP; James E. Armstrong, IV; Brian S. Matross

(57) ABSTRACT

A door harness attaching structure includes: an opening provided on an inner panel of a hinge-open/close-type door; and a hole provided on an end wall at the hinge side of the inner panel. The opening is composed of a large main opening covered by a panel unit of a door module and a small sub opening continued to the main opening, notched toward the hole for attaching a grommet and covered by a cover member. A wiring harness of the door module includes: a harness portion projecting from the panel unit; and the grommet provided at a tip end of the harness portion and attached through the hole.

16 Claims, 2 Drawing Sheets

US 9,228,678 B2

DOOR HARNESS ATTACHING STRUCTURE

CROSS REFERENCE TO RELATED APPLICATIONS

This application is on the basis of Japanese Patent Application No. 2013-187481, the contents of which are hereby incorporated by reference.

TECHNICAL FIELD

The present invention relates to a door harness attachment structure in which a wiring harness with a grommet is routed in a door module applied to a hinge-open/close-type vehicle door.

BACKGROUND ART

Conventionally, various door harness attaching structures have been proposed for attaching a door wiring harness (door harness) to a side door of a vehicle.

As one conventional example, in PTL 1, it is described that a through-hole is provided on a front end wall of a metallic door frame to be coupled to a vehicle body with a hinge. A rubber-made grommet attached to a door harness is inserted into the through-hole, and the door harness is arranged from a door to the vehicle body. Thus, the grommet is intended to prevent the water from entering via the through-hole.

Further, in PTL 1, as the other conventional example, it is described that a substantially L-shaped groove concave is provided from a vehicle interior side plate to a front end plate of a door inner panel of a door frame. A rubber-made grommet is fitted into the concave and the door harness is routed along the groove. A watertight door weather strip is arranged in a direction crossing an outer surface of the grommet.

Further, in PTL 1, as an invention example, it is described that a substantially L-shaped groove concave is provided from a vehicle interior side plate to a front end plate of a metallic door inner panel. Previously the door harness and various electric components are fixedly provided on a resin-made panel covering a large opening of the vehicle interior side plate of the door inner panel. A rectangular tubular-shaped protector of the door harness is fitted into the substantially L-shaped groove concave of the door inner panel. A rubber-made corrugated member is provided on an attaching hole of the front end plate of the door inner panel. In an interior of the door, a protector and the corrugated member are jointed together with a rubber-made intermediate diameter pipe. A door weather strip is arranged on an outer wall of the front end plate of the door inner panel in between the corrugated member and the protector.

Further, in PTL 2, as a conventional example, it is described that a door module panel is provided on a large opening at a vehicle interior side of a door frame. The door module panel is provided with a door harness, a hole penetrating the door harness, and a first grommet fitted into the hole. A second grommet provided at a tip end of the door harness is inserted into a through-hole provided on a front end plate of the door frame.

Further, in PTL 2, as an invention example, it is described that a visor is provided on a wall of a door module panel outside of a vehicle at a through-hole penetrating a door harness of the door module panel, so that the visor prevents a water drop from entering via an opening for lifting a window glass of a door frame.

CITATION LIST

Patent Literature

PTL 1: JP, A, 2002-120668 (FIGS. 4 and 5)
PTL 2: JP, A, 2002-274289 (FIGS. 2 and 7)

SUMMARY OF INVENTION

Technical Problem

For example, according to the structure described in the conventional example in PTL 1, for avoiding interference between the lifted window glass and the door harness, generally, a devious route of the wiring harness is taken. Thereby, the wiring harness becomes long, and becomes high cost. Further, because the electric wire of the wiring harness is long, it is difficult to make a door module, and troublesome works such as handling the electric wire, passing the grommet through a hole of the door inner panel, and picking up a branch line of the wiring harness from a resin-made seal screen covering a large opening at the vehicle interior side of the door inner panel are needed.

When judging the through grommet type structure as described in the conventional example of PTL 1 with three grades evaluation (A is good, B is middling, C is bad), assembling workability of the wiring harness to the door is C, the cost caused by the length of the electric wire is C, the component cost of the grommet is A, and the noise reduction effect of the door weather strip upon closing the door is A.

Further, for example, according to the structure described in the other conventional example of PTL 1, routing of the wiring harness is straight, and there is a cost merit owing to a short electric wire length. Further, because there is no penetrating work for a grommet upon assembling (through-less grommet type), routing workability of the wiring harness is good. However, the component cost of the grommet is higher than the through grommet type because of the number of the components of the grommet (reinforcing inner member and the like are necessary other than the grommet main body) and because of difficulty of the shape. Further, for example, due to a gap between a concave at the vehicle front end side of the door and the door weather strip, the noise reduction effect upon closing the door is reduced.

When judging the through-less grommet type structure as described in the other conventional example of PTL 1 with three grades evaluation, assembling workability of the wiring harness to the door is A, the cost caused by the length of the electric wire is A, the component cost of the grommet is C, and the noise reduction effect of the door weather strip upon closing the door is C.

Further, for example, according to the structure described in the conventional example of PTL 2, routing of the wiring harness is straight, and there is a cost merit owing to a short electric wire length. Further, the noise reduction effect by the door weather strip is good. However, because the first grommet is provided on the through-hole at the vehicle interior side plate of the door inner panel, and the second grommet is provided on the through-hole at the front end side plate of the door inner panel, two grommets are needed and the component cost of the grommets is increased. Further, because there are two positions for passing and fixing the grommets upon assembling to the door panel, the assembling workability is less than the through-less grommet type.

When judging the through two grommets type structure as described in the conventional example of PTL 2 with three grades evaluation, assembling workability of the wiring harness to the door is B, the cost caused by the length of the electric wire is A, the component cost of the grommet is B, and the noise reduction effect of the door weather strip upon closing the door is A.

Further, according to the structure described in the invention example of PTL 1, three components of the protector, the corrugated member, and the intermediate diameter pipe are necessary and the cost is increased. Further, there is a fear that the insertion workability of the wiring harness for passing the three components may be reduced.

Further, according to the structure described in the invention example of PTL 2, because the harness penetrating hole of the door module panel is not fully covered by the visor, there is a fear that moisture or the like may enter an inside of a vehicle via the harness penetrating hole from a vehicle outside of the door module panel.

In view of the above, an object of the present invention is to provide a door harness attaching structure able to improve the assembling workability of the wiring harness to the door, to reduce cost resulting from the structure and the number of grommets in the wiring harness, and to improve the waterproof property of the door module and the noise reduction effect of the door weather strip.

Solution to Problem

For attaining the object, according to a first aspect of the present invention, there is provided a door harness attaching structure including:
an opening provided on an inner panel of a hinge-open/close-type door; and
a hole provided on an end wall at the hinge side of the inner panel,
wherein the opening is composed of a large main opening covered by a panel unit of a door module and a small sub opening continued to the main opening, notched toward the hole for attaching a grommet and covered by a cover member, and
wherein a wiring harness of the door module includes: a harness portion projecting from the panel unit; and the grommet provided at a tip end of the harness portion and attached through the hole.

According to the above, the grommet of the wiring harness is assembled to the hole on the end wall from the main opening via the sub opening of the door inner panel. Because an attaching distance to the hole is reduced by the sub opening, an attaching operation of the grommet to the hole becomes easy. After the grommet is attached to the hole, the cover member closes the sub opening and fully covers the sub opening to make waterproof and dustproof. The main opening is sealed with the panel unit of the door module. The cover member may be separated from or integrated with the panel unit of the door module.

According to a second aspect of the present invention, there is provided the door harness attaching structure as described in the first aspect, wherein the cover member is provided integrally with the panel unit.

According to the above, the cover member is treated integrally with the panel unit as a part of the door module, and the main opening and the sub opening of the door inner panel are simultaneously covered by the door module to make waterproof and dustproof.

According to a third aspect of the present invention, there is provided the door harness attaching structure as described in the first or second aspect, wherein the cover member is openably and closably coupled to the panel unit.

According to the above, after the grommet of the wiring harness is assembled to the hole on the door inner panel, the panel unit of the door module is attached to the main opening of the door inner panel, and then the cover member covers the sub opening. The cover member is coupled to the panel unit with a hinge separated from or integrated with the panel unit.

According to a fourth aspect of the present invention, there is provided the door harness attaching structure as described in any one of the first to third aspects,
wherein a groove for guiding out the harness portion is provided on at least one of an end edge of the sub opening and an end edge of the cover member.

According to the above, the cover member covers the sub opening, and at the same time, the harness portion abuts on an inner wall of the groove to be held. Preferably, an outer wall of the harness portion is closely attached to the inner wall of the groove without a gap. The groove works as a grommet. When any one of the sub opening and the cover member is provided with the groove, the harness portion is caught between the groove and the other to be held.

According to a fifth aspect of the present invention, there is provided the door harness attaching structure as described in any one of the first to fourth aspects,
wherein while the cover member covers the sub opening, a door weather strip is provided in between the cover member and the hole.

According to the above, the door weather strip is closely attached to a surface of the door inner panel without a gap without contacting the cover member. Thereby, the noise reduction effect upon closing the door (while the vehicle is running) is improved.

Advantageous Effects of Invention

According to the invention described in the first aspect, owing to the sub opening provided on the door inner panel, the grommet of the wiring harness can be easily and surely assembled to the hole on the end wall in a short distance with good workability. Further, when the sub opening is covered by the cover member after the grommet is assembled, the waterproof property and the dustproof property of the sub opening of the door module can be improved. Further, by using a penetrating type grommet having a simple structure, the grommet cost can be reduced.

According to the invention described in the second aspect, the handling property of the cover member can be improved as a part of the door module, and the sub opening can be covered effectively together with the main opening.

According to the invention described in the third aspect, the cover member can be effectively and easily opened and closed so that the sub opening can be sealed easily, and a check or maintenance around the grommet can be easily done by opening the grommet.

According to the invention described in the fourth aspect, the harness portion is held or preferably closely sealed by the groove provided on the sub opening or the cover member to replace the conventional grommet. Therefore, the number of the grommets can be reduced and the cost can be reduced. Further, the waterproof property and the dustproof property can be improved.

According to the invention described in the fifth aspect, when the door weather strip is closely attached to the surface of the door inner panel without a gap without contacting the cover member, the noise reduction effect upon closing the door (while the vehicle is running) can be improved.

These and other objects, features, and advantages of the present invention will become more apparent upon reading of the following detailed description along with the accompanied drawings.

DESCRIPTION OF EMBODIMENTS

Figure 1:
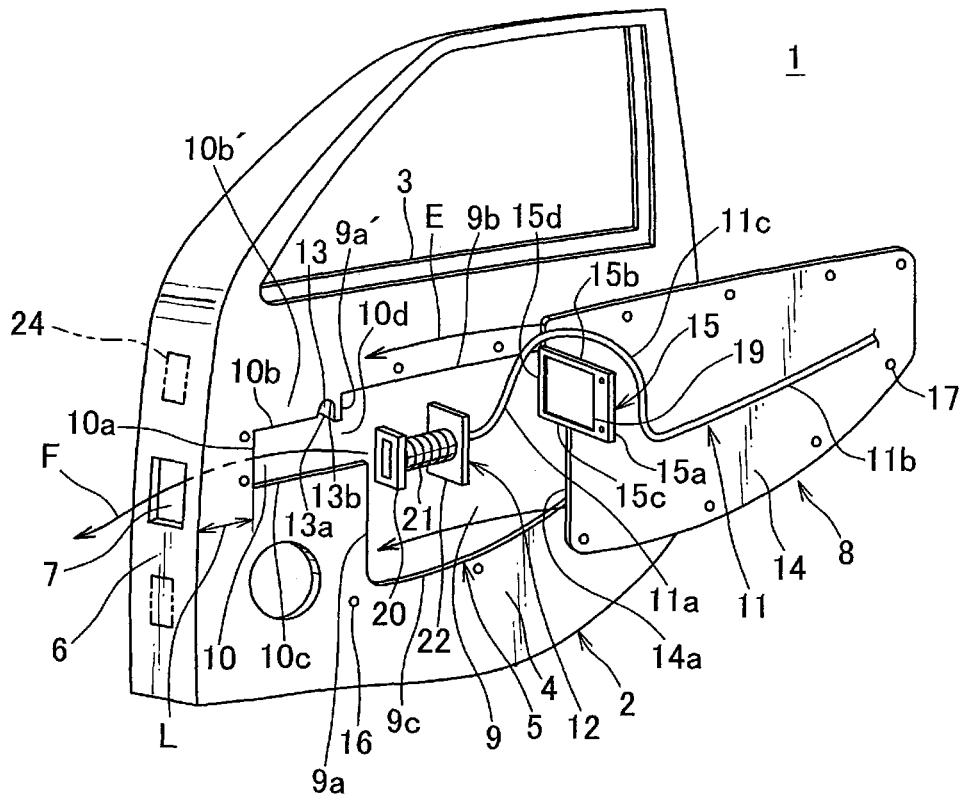
FIG. 1 is an exploded perspective view showing an embodiment of a door harness attaching structure according to the present invention.
Figure 2:
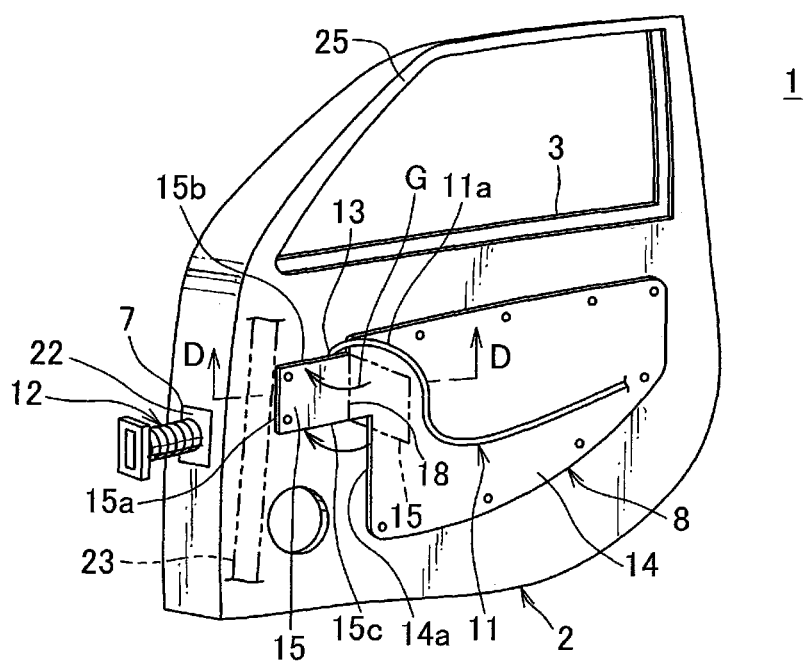
FIG. 2 is a perspective view showing an attaching completion condition of the door harness attaching structure.
Figure 3:
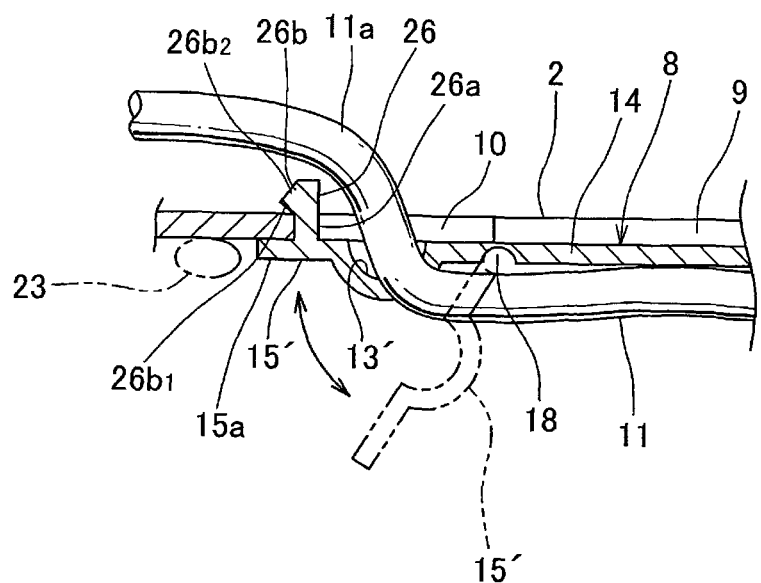
FIG. 3 is a sectional view taken on line D-D of FIG. 2 showing an embodiment of a cover member of a door module in the door harness attaching structure.

FIGS. 1 to 3 show an embodiment of a door harness attaching structure according to the present invention.

As shown in FIG. 1, a right front side door 1 of a hinge-open/close-type vehicle door includes: a metallic door inner panel 2 disposed in an inside of the vehicle; a metallic door outer panel 3 disposed in an outside of the vehicle; a large opening 5 provided on a wall portion 4 (plate portion) in an inside of a vehicle of the door inner panel 2; a small hole 7 penetrating a front end wall portion 6 (end wall at a hinge 24 side) of the door inner panel 2 and continuing to the opening 5; and a door module 8 for covering the opening 5. This configuration is also applied to a not-shown left front side door of the vehicle (layout of the configuration is bilaterally symmetric).

The opening 5 is composed of a large substantially rectangular-shaped main opening 9, and a small substantially rectangular-shaped sub opening 10 extended forward of the vehicle from a substantially vertical front end 9a of the main opening 9 to around the hole 7 on the front end wall portion 6 and notched integrally with the main opening 9.

The main opening 9 includes: the substantially vertical front end 9a; substantially horizontal upper end 9b and lower end 9c; and a curved or inclined not-shown rear end. The sub opening 10 includes: a substantially vertical front end 10a; and substantially horizontal upper end 10b and lower end 10c. A rear end of the sub opening 10 is communicated with an upper part of the front end 9a of the main opening 9 (communicated portion is denoted by reference sign 10d). The lower end 10c of the sub opening 10 is continued crossing to the front end 9a of the main opening 9. The upper end 10b of the sub opening 10 is continued to the upper end 9b of the main opening 9 in a step manner via a front end upper portion 9a' of the main opening 9.

The main opening 9 is useful for attaching not-shown auxiliary devices or electric components such as a window glass lifting unit, a speaker unit, and a door lock unit disposed in between the door inner panel 2 and the door outer panel 3. The sub opening 10 is one element of the present invention, and works as a working hole for assembling (fitting) a penetrating-type grommet 12 (waterproof grommet) provided at a tip end of a door wiring harness 11 of a door module 8 to the hole 7 on the front end wall portion 6.

Because the sub opening 10 is extended to around the hole 7 for assembling the grommet, while an operator grabs the grommet 12 of the door wiring harness 11 by hand, for example, the hand is slidingly inserted into the sub opening 10 from the main opening 9, and the hand is moved close to the hole 7 for assembling the grommet. Thereby, the grommet 12 can be assembled (fitted) to the hole 7 effectively, easily, and surely.

A groove 13 is swollen toward an outside of a vehicle in a door thickness direction for guiding out and held upward from the sub opening 10 a front harness portion 11a of the door wiring harness 11 projected forward from the door module 8 around a rear end of an upper edge 11W of the sub opening 10 of the door inner panel 2 under a condition that the door module 8 is assembled. In the groove 13, a lower side portion 13a (semi-circular lower opening) communicated with the sub opening 10 is the deepest, concaved further toward a vehicle outside in a door thickness direction than the upper end 10b of the sub opening, and the depth is gradually reduced as extended upward. An upper end 13b of the groove 13 is continued crossing to a surface of the wall portion 4 of the door inner panel 2 disposed at the inside of the vehicle.

The door module 8 includes: a large panel unit 14; a cover member 15 openably and closably coupled to a front end 14a of the panel unit 14; and the door wiring harness 11 routed and fixed to the panel unit 14. The door wiring harness 11 includes: a rear harness portion 11b fixed to the surface of the panel unit 14 with a banding band or the like; a front harness portion 11a projected forward freely (flexible and extensible) from the panel unit 14; and a synthetic-rubber-made waterproof grommet 12 assembled to a tip end of the front harness portion 11a. The front and rear harness portions 11a, 11b are made by banding a plurality of electric wires with a tape, a mesh tube, or the like.

A plurality of small holes 16 is provided on peripheral edges of the main opening 9 and the sub opening 10 of the door inner panel 2 for fixing the panel unit 14 and the cover member 15 of the door module 8 with screws, locking clips, or the like. Similarly, small holes 17 are provided on peripheral edges of the panel unit 14 and the cover member 15 of the door module 8. It is also possible to provide integrally not-shown locking members such as locking claws on peripheral edges of the panel unit 14 and the cover member 15 of the door module 8 for engaging with the small holes 16 or an end edge of the opening 5 of the door inner panel 2.

The rear harness portion 11b of the door wiring harness 11 is routed straight and fixed to a vehicle inside wall of the panel unit 14 of the door module 8. A front half of the door wiring harness is curved upward from the straight rear harness portion 11b (the curved portion is denoted by reference sign 11c), and guided out forward freely (flexible and extensible) from a front end upper portion of the panel unit 14. Preferably, the curved upward portion 11c is also fixed to the panel unit 14.

The cover member 15 is integrally provided on the front end upper portion of the panel unit 14 for covering the sub opening 10 of the door inner panel 2. The cover member 15 of this embodiment is integrally coupled to the front end upper portion of the panel unit 14 openably and closably (rotatably) with a thin hinge 18 (FIG. 2). The panel unit 14 is made of synthetic resin, and formed one size larger than the main opening 9 of the door inner panel 2.

The cover member 15 is made of synthetic resin, and formed one size larger than the sub opening 10. The cover member 15 includes: a substantially vertical side 15a at a tip end of rotation as a front side in a closed condition in FIG. 2; substantially horizontal upper side 15b and lower side 15c; and a side 15d at a base end of rotation, namely, a rear side. The rear side 15d is coupled to the front end 14a of the panel unit 14 with the flexible thin hinge 18 (FIG. 2). Preferably, a rear wall of the cover member 15 (vehicle outside wall in a closed condition) is provided with a rectangular waterproof packing, a thin concave, or a checking window if waterproof is unnecessary denoted by reference sign 19.

Incidentally, it is also possible to form the cover member 15 separated and independent from the panel unit 14 and to openably and closably couple the cover member 15 to the panel unit 14 with, for example, a metallic hinge (18). Further, it is also possible to form the cover member integrally with the panel unit un-openably and un-closably without using the hinge (18). Further, it is also possible to form the cover member 15 separated and independent from the panel unit 14 and to lock the cover member 15 to the sub opening 10 with a locking means without using the hinge (18). However, because it takes labor and time to prepare the cover member other than the panel unit, and to bring them independently on an assembling line and the like, it is preferable to form the cover member 15 integrally with the panel unit 14.

Front and rear surfaces of the panel unit 14 of the door module 8 are provided with auxiliary devices or the like such as a connector connected to a not-shown vertical branch line of the door wiring harness 11 (each connector connected to a speaker, a door lock, or the like), or a not-shown door switch unit for opening and closing a window glass. The door module 8 is composed of the door wiring harness 11 including these connectors and branch lines, the auxiliary devices or the like, the panel unit 14, and the cover member 15. It is also possible to attach the other electric components and the other auxiliary devices to the door module 8.

The grommet provided on the tip end (front end) of the door wiring harness 11 is integrally made of synthetic rubber, and composed of a front end rectangular tubular connector fitting portion 20, a middle corrugate tube portion 21, and a base end rectangular-plate-shaped fitting and fixing portion 22. The front end connector fitting portion 20 is fitted with a connector 28 (refer to FIG. 4) housing terminals connected to ends of the electric wires of the door wiring harness 11, and the connector 28 is connected to a not-shown vehicle body side (battery side) connector. In the base end fitting and fixing portion 22, for example, a middle portion in a thickness direction has a peripheral groove 22a (refer to FIG. 4A) for fitting a peripheral edge of the hole 7 on the front end wall portion 6 of the door inner panel 2. A shape of the fitting and fixing portion 22 is not limited to one type.

Figure 4A:
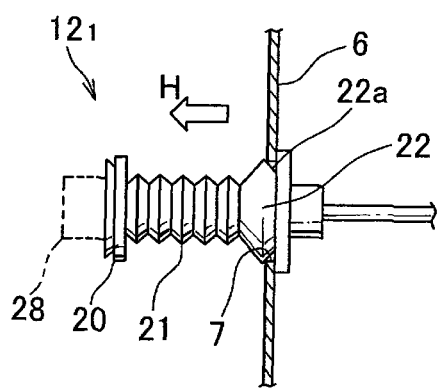
FIG. 4A is a partially sectional side view showing an embodiment of a grommet of a door harness.
Figure 4B:
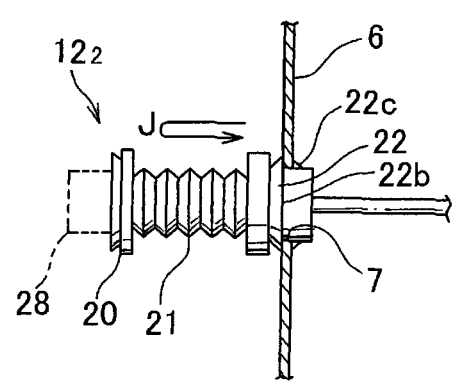
FIG. 4B is a partially sectional side view showing another embodiment of the grommet of the door harness.

As one embodiment is shown in FIG. 4A, an attachment of a grommet 12$_1$ (normal push-type grommet) to the hole 7 is done by inserting the connector fitting portion 20 and the corrugate tube portion 21 into the hole 7 in an arrow H direction from a rear to front, and by fitting the peripheral groove 22a of the fitting and fixing portion 22 with the peripheral edge of the hole 7 from a rear (from a rear wall side of the front end wall portion). Alternatively, as the other embodiment shown in FIG. 4B, an attachment of an inner type grommet 12$_2$ (having a not-shown synthetic-resin-made reinforcing inner at an inside of the fitting and fixing portion 22) to the hole 7 is done by inserting the connector fitting portion 20 and the corrugate tube portion 21 into the hole 7 from a rear to front, and then as shown in an arrow J, by pushing the fitting and fixing portion 22 backward to fit the peripheral edge of the hole 7 in between a step wall 22b and a locking projection 22c of the fitting and fixing portion 22 from a front surface of the front end wall portion 6.

As described above, an assembling operation of the grommet 12 is easily and surely done by putting a hand into the sub opening 10 continued to the front side of the main opening 9 of the door inner panel 2, and by pushing the grommet 12 into the hole 7. Namely, as a size L in FIG. 1, because a distance L from the sub opening 10 to the hole 7 is short, and the hole 7 is near the sub opening 10, an insertion operation time of the grommet 12 can be reduced without looking, and the insertion operation of the grommet 12 becomes as ease as the insertion operation of the conventional through-less grommet.

Preferably, an attachment (assembling) of the grommet 12 to the hole is done before the door module 8 is assembled to the door inner panel 2, because a hand can be put into the main opening 9 at the same time. For example, while an operator supports the door module 8 with one hand (for example, left hand), and moves the door module 8 in an arrow E direction in FIG. 1, the other hand (for example, right hand) assembles the grommet 12 to the hole 7 on the front end wall portion 6 via the sub opening 10 in an arrow F direction in FIG. 1. Because the cover member 15 of the door module 8 is open toward an inside of the vehicle and separated from the operator backward, the cover member does not disturb the operation. Because the door outer panel 3 is disposed at a vehicle outside of the door inner panel 2, of course, the grommet 12 cannot be assembled to the hole 7 from a vehicle outside.

As shown in FIG. 2, the grommet 12 is attached to the hole 7, the panel unit 14 of the door module 8 is fixed to the peripheral edge of the main opening 9 (FIG. 1) of the door inner panel 2, and then, the cover member 15 closes the sub opening 10 as an arrow G. The front harness portion 11a is held along the groove 13 of the door inner panel 2 and guided out in a curved shape from an upper end of the cover member 15.

An outer peripheral wall (semi-circular wall) at vehicle outside of the circular-sectional-shaped front harness portion 11a is closely attached to a semi-circular-sectional-shaped inner wall of the groove 13 without a gap, and a semicircular wall at vehicle inside of the front harness portion 11a is crushed into a planar shape and closely attached to the inner wall of the cover member 15 without a gap. Thereby, the cover member 15 and the groove 13 become waterproof without a gap. Further, the front side 15a, the upper side 15b, and the lower side 15c of the cover member 15 are closely attached to a vehicle inner wall of the door inner panel 2 at the peripheral edge of the sub opening 10 (FIG. 1) without a gap to ensure waterproof. Because the door wiring harness 11 is held and sealed by the groove 13, the groove 13 is a substitute for the conventional grommet (conventional embodiment in PTL 2).

A vertical portion of a waterproof and soundproof door weather strip 23 is arranged vertically along (contacting) a vehicle inner wall of the door inner panel 2 near the front side 15a of the cover member 15 without touching the cover member 15. Thereby, the water and the noise are surely prevented from entering an inner side of a vehicle than the door inner panel 2 when the door 1 is fully closed. The door weather strip 23 is arranged in a substantially rectangular annular shape long a front side (vertical portion is arranged), a lower side, and a rear side of the door inner panel 2, and a upper window frame 25.

As another embodiment of the cover member 15 of the door module 8 is shown in FIG. 3 (though FIG. 3 is a sectional view taken on line D-D of FIG. 2, for convenience shake, a direction inward and outward from a vehicle in FIG. 3 corresponds to FIG. 2), a cover member 15' is locked at an end edge of the sub opening 10 of the door inner panel 2 with a locking means such as a claw 26 or the like.

For example, a pair of upper and lower claws 26 is provided at a font end of the cover member 15', and each composed of a flexible support piece 26a projected toward a vehicle outside wall of the cover member 15' and a claw main body 26b projected forward from a tip end of the support piece 26a. The claw main body 26b includes: a locking all 26$b_1$ and a guide inclined wall 26$b_2$. The locking wall 26$b_1$ of the claw main body 26*b* is abutted on and engaged with an end edge of the sub opening 10, namely, a vehicle outside wall of the door inner panel 2. The front side 15*a* of the cover member 15' is projected forward of the claw 26, and a vehicle outside wall of the front side 15*a* is closely attached to a front end edge of the sub opening 10 of the door inner panel 2. Similarly, the upper and lower ends of the cover member 15' are closely attached to the upper and lower end edges of the sub opening 10. Thereby, the sealing property between the sub opening 10 and the cover member 15' is improved.

In the embodiment shown in FIG. 3, the groove 13' is swollen toward an inside of a vehicle from not the door inner panel 2 but the cover member 15' for guiding out and held the front harness portion 11*a* of the door wiring harness 11. A semicircular wall at vehicle inside of the front harness portion 11*a* is closely attached to the inner peripheral wall of the semicircular-sectional-shaped groove 13'. Further, a semicircular wall at vehicle outside of the front harness portion 11*a* is crushed into a planar shape and closely attached to a vehicle inside wall of the door inner panel 2 without a gap. Thereby, a gap between the groove 13' of the cover member 15' and the door inner panel 2 is disappeared, and the waterproof property is improved. Incidentally, it is also possible to provide semicircular grooves 13, 13' on both cover member 15' and the door inner panel 2, and to make an outer peripheral wall of the circular-sectional-shaped front harness portion 11*a* closely attached to inner peripheral walls of both grooves 13, 13' without a gap.

In FIG. 3, the cover member 15' is opened about the hinge 18 as shown by the chain line, and closed as shown by the solid line to be locked on an end edge of the sub opening 10 with the claw 26. Further, the vertical portion of the door weather strip 23 is arranged around forward of the front side 15*a* of the cover member 15, the cover member 15' is positioned inside of a circumferential direction of the circular door weather strip 23, and the vertical portion of the door weather strip 23 is directly and closely attached to the door inner panel 2 to exhibit the good waterproof property and the good noise reduction effect upon closing the door.

According to the door harness attaching structure as shown in FIGS. 1 to 3, owing to the sub opening 10 extended by notching near the hole 7 for inserting the wiring harness provided on the front end wall portion 6 of the door inner panel 2, the insertion distance of the grommet 12 to the hole 7 is reduced. Thereby, the grommet 12 provided at the tip end of the door wiring harness 11 can be assembled to the hole 7 for inserting the wiring harness on the front end wall portion 6 effectively, easily, and surely similar to the conventional through-less grommet of PTL 1.

Further, the cover member 15, 15' of the door module 8 closes the working sub opening 10 of the door inner panel 2, and the front harness portion 11*a* guided out from the sub opening 10 to the door module 8 is closely attached without a gap to the groove 13 of the door inner panel 2 or the groove 13' of the cover member 15' to ensure the sealing property. Thereby, the conventional grommet (embodiment in PTL 2) assembled to the door inner panel 2 becomes unnecessary, and an operation for pushing and fixing the conventional grommet into a hole of the door inner panel also becomes unnecessary.

Further, because the cover member 15, 15' is integrally, openably and closably coupled to the panel unit 14 of the door module 8 with the hinge 18, the assembling operation of the panel unit 14 to the door inner panel 2 and the assembling operation of the cover panel 15, 15' can be integrally and easily done. Thereby, the assembling workability of the door wiring harness 11 to the side door 1 is judged A similar to the conventional though-less grommet with three grades evaluation (A is good, B is middling, C is bad). Further, by opening the cover member 15, 15' effectively about the hinge 18, the check and the maintenance of the rear fixing portion 22 of the grommet 12 via the sub opening can be easily done.

Further, the door wiring harness 11 (in particular, rear harness portion 11*b*) is arranged substantially straight in the door module 8. Further, by using the door module 8, it becomes unnecessary to take a devious route avoiding the door wiring harness 11 for preventing interference on a lift path of a window glass in the embodiment of PTL 1. Therefore, the length of the electric wire of the door wiring harness 11 can be reduced, and the cost of the electric wire can be reduced. In this way, the cost due to the electric wire length is judged A with three grades evaluation.

Further, only one grommet 12 is used, and the through-less grommet which has a complex structure and is expensive is not used, but the through-type grommet 12 is used. Therefore, the component cost of the grommet 12 is judged A. Owing to these, the component cost of the door wiring harness 11 including a plurality of electric wire and the grommet 12 can be reduced.

Further, by using the through-type grommet 12, it becomes unnecessary to abut the door weather strip 23 on a vehicle inside surface of the conventional through-less grommet. Further, the door weather strip 23 is directly and closely attached to a vehicle inside wall of the door inner panel 2 around forward of the cover member 15, 15' without touching the cover member 15, 15' of the door module 8. Thereby, a contact area between the door weather strip 23 and the door inner panel 2 is increased, and the noise reduction effect and the waterproof property are improved. In this way, the noise reduction effect owing to the door weather strip 23 is judged A.

Incidentally, according to the above embodiment, in FIG. 1, the door wiring harness 11 is guided forward from the upper side of the cover member 15, and in FIG. 2, guided backward (toward the panel unit 14) from the upper side 15*b* of the cover member 15. However, for example, it is also possible to provide the groove 13 for guiding out the wiring harness on the lower end 10*c* of the sub opening 10 or on the front end 9*a* of the main opening 9, and in FIG. 2, to guide backward the door wiring harness 11 from a lower side of the cover member 15, 15' or from the front end 9*a* of the panel unit 14. In this way, the door wiring harness 11 is arranged further straight and the length of the door wiring harness 11 is further reduced. It is also possible to provide the groove 13 for guiding out the wiring harness on the front end 9*a* of the panel unit 14.

Further, according to the above embodiment, the door harness attaching structure is applied to the front side door 1 of a vehicle. However, for example, the above door harness attaching structure can be also applied to left and right rear side doors, a back door, or a door of other than a vehicle. Further, the present invention is also effective to a door harness attaching (routing) method, a door module attaching structure, or a door module attaching method other than the door harness attaching structure.

Industrial Applicability

The door harness attaching structure according to the present invention can be used for improving the assembling workability of the wiring harness to the door, for reducing cost resulting from the electric wire length of the wiring harness, the number of grommets, or the grommet structure, and for improving the waterproof property of the door module and the noise reduction effect of the door weather strip.

Reference Signs List 1 door
2 door inner panel
5 opening
6 front end wall portion
7 hole
8 door module
9 main opening
10 sub opening
11 door wiring harness
11a front harness portion
12 grommet
13, 13' groove
14 panel unit
15, 15' cover member
23 door weather strip

What is claimed is:

1. A door harness attaching structure comprising:
a hinge-open/close-type door having an inner panel with an inner wall portion defining an opening, and a front end wall defining a hole, wherein the opening is composed of a large main opening and a small sub opening continued to the main opening, notched toward the hole;
a door module including a panel unit configured to cover the main opening, and a cover member movable relative to the panel unit and configured to cover the sub opening;
a wiring harness having a harness portion projecting from the panel unit; and
a grommet provided at a tip end of the harness portion and fitted into the hole of the front end wall.

2. The door harness attaching structure as claimed in claim 1,
wherein the cover member is provided integrally with the panel unit.

3. The door harness attaching structure as claimed in claim 1,
wherein the cover member is openably and closably coupled to the panel unit.

4. The door harness attaching structure as claimed in claim 2,
wherein the cover member is openably and closably coupled to the panel unit.

5. The door harness attaching structure as claimed in claim 1,
wherein a groove for guiding out the harness portion is provided on at least one of an end edge of the sub opening and an end edge of the cover member.

6. The door harness attaching structure as claimed in claim 2,
wherein a groove for guiding out the harness portion is provided on at least one of an end edge of the sub opening and an end edge of the cover member.

7. The door harness attaching structure as claimed in claim 3,
wherein a groove for guiding out the harness portion is provided on at least one of an end edge of the sub opening and an end edge of the cover member.

8. The door harness attaching structure as claimed in claim 4,
wherein a groove for guiding out the harness portion is provided on at least one of an end edge of the sub opening and an end edge of the cover member.

9. The door harness attaching structure as claimed in claim 1, wherein while the cover member covers the sub opening, a door weather strip is provided in between the cover member and the hole.

10. The door harness attaching structure as claimed in claim 2, wherein while the cover member covers the sub opening, a door weather strip is provided in between the cover member and the hole.

11. The door harness attaching structure as claimed in claim 3, wherein while the cover member covers the sub opening, a door weather strip is provided in between the cover member and the hole.

12. The door harness attaching structure as claimed in claim 4, wherein while the cover member covers the sub opening, a door weather strip is provided in between the cover member and the hole.

13. The door harness attaching structure as claimed in claim 5, wherein while the cover member covers the sub opening, a door weather strip is provided in between the cover member and the hole.

14. The door harness attaching structure as claimed in claim 6, wherein while the cover member covers the sub opening, a door weather strip is provided in between the cover member and the hole.

15. The door harness attaching structure as claimed in claim 7, wherein while the cover member covers the sub opening, a door weather strip is provided in between the cover member and the hole.

16. The door harness attaching structure as claimed in claim 8, wherein while the cover member covers the sub opening, a door weather strip is provided in between the cover member and the hole.

* * * * *